United States Patent [19]

Van Hijfte et al.

[11] 4,160,782

[45] Jul. 10, 1979

[54] PROCESS FOR TREATING UREA BODIES

[75] Inventors: Willy Henri P. Van Hijfte, Assenede; Rafael Arsene J. Goethals, Ertvelde, both of Belgium

[73] Assignee: Compagnie Neerlandaise de l'Azote, Brussels, Belgium

[21] Appl. No.: 868,183

[22] Filed: Jan. 9, 1978

Related U.S. Application Data

[63] Continuation of Ser. No. 168,754, Aug. 3, 1971, abandoned.

[30] Foreign Application Priority Data

Aug. 6, 1970 [GB] United Kingdom ............... 38046/70

[51] Int. Cl.² .......................................... C07C 126/00
[52] U.S. Cl. ................................................. 260/555 C
[58] Field of Search ..................................... 260/555 C

[56] References Cited

U.S. PATENT DOCUMENTS

3,290,371  12/1966  Brooke et al. ................... 260/555 C

OTHER PUBLICATIONS

Talet, Amino Plastics, pp. 20-43.

*Primary Examiner*—O. R. Vertiz
*Assistant Examiner*—Thomas W. Roy
*Attorney, Agent, or Firm*—Edward J. Brenner

[57] ABSTRACT

Urea bodies, such as crystals, prills, pellets and the like, with a reduced caking tendency are obtained by processing such bodies or a concentrated urea solution or melt produced in the urea synthesis, which is processed to form such bodies, with an aqueous solution containing an effective amount of dimethylol urea and/or trimethylol urea, which solution contains about 2 to about 5 mols bonded and free formaldehyde per mol of urea.

22 Claims, No Drawings

PROCESS FOR TREATING UREA BODIES

CROSS-REFERENCE TO RELATED APPLICATION

The present application is a continuation of Ser. No. 168,754, filed Aug. 3, 1971, abandoned.

This invention generally relates to an improvment of urea bodies, such as crystals, pellets, prills and the like, and in particular to processes for producing such urea bodies having a reduced tendency to cake.

Urea is generally produced by a reaction of ammonia with carbon dioxide at elevated temperature and pressure. Various processes are known for the commercial application of this reaction (see e.g. Kirk-Othmer, Encyclopedia of Chemical Technology, 2nd Edition, Volume 21 (1970) pp. 42–51), which processes normally are productive of a 70–80% aqueous urea solution. This solution can be processed to form urea bodies, such as crystals, pellets, prills, and the like, in various ways (see e.g. Kirk-Othmer, 2nd Edition, Volume 21 (1970) pp. 51–52). The urea bodies thus produced exhibit an annoying tendency to cake, which may vary somewhat, depending on the manner in which the urea solution has been processed into urea bodies. This tendency to cake makes it impossible for the urea product to be stored and transported in bulk without particular provisions, and not seldom an initially free-flowing product to change into a hard solid mass after some time, which can only be comminuted into a suitable product by the investment of much time and energy.

Various proposals have been made to reduce the caking tendency of urea bodies, such as crystals, pellets, prills, granules and the like. These prior proposals can generally be distinguished into two groups. The first group comprises processes in which the urea is subjected to a treatment in the crystallized state, which treatment usually comprises the addition of one or more specific compounds such as magnesium carbonate, chalk, kieselgur, calcium sulphate, clay, clay treated with surfactants, such as sulfonates or amines, etc. Generally speaking, these additives incorporate foreign elements into the urea, which are not or poorly compatible with the purpose for which the urea is to be used. Moreover, these additives are often insoluble or poorly soluble in water, so that urea treated with them when dissolved in water does not produce clear solutions, which is a disadvantage for various uses of urea.

Included in this first group is a composition which is commercially available and consists of a mixture of polyvinyl acetate, a urea formaldehyde condensate, and a detergent. When dissolved in water, urea treated with this composition produces a highly foaming solution. When urea treated with this composition is stored in polyethylene bags, the sealed edges of the bags become detached after a period as short as several days.

The second group comprises processes in which specific compounds are added to the urea melt produced in the urea synthesis, before the melt is processed to form urea bodies, such as crystals, pellets, prills, granules and the like. One example of these compounds is a surface-active agent, for example, an alkyl aryl sulfonate or a naphthalene sulfonate, which affects the crystal form of the urea crystallizing from the melt so as to provide a somewhat reduced tendency to cake, but causes aqueous solutions of the urea to foam, thereby rendering it unfit for certain applications, such as the preparation of urea-based adhesive.

Another example is an aqueous solution of a urea formaldehyde condensate produced by reacting a mixture of 7 mol formaldehyde with 3–5 mol urea in an acidic medium. This condensate contains methylene bonds as occur in methylene diurea ($H_2N-CO-NH-CH_2-NH-CO-NH_2$). This solution, which contains 30–40% water, becomes turbid after storage for some time, which adversely affects the clear solubility of urea treated with it.

The object of the present invention is to provide agents for reducing the caking tendency of urea bodies, such as crystals, pellets, prills, and the like, which agents do not exhibit the disadvantages described above.

According to the invention, there is used an aqueous solution for this purpose, which contains an active proportion of at least one methylol urea compound, which solution contains about 2 to about 5 mol of bonded and free formaldehyde per mol of urea.

On the ground of equilibrium reactions it can be assumed that aqueous solutions of trimethylol urea always contain a small proportion of dimethylol urea, and aqueous solutions of dimethylol urea always contain small proportion of trimethylol urea. This, however, is difficult to show or measure by methods of analysis. In view of this, in the subject specification and in the accompanying claims, solutions not containing a deliberately formed composition of dimethylol urea and trimethylol urea but, as far as can be established contain as the active component dimethylol urea or trimethylol urea only, are respectively termed "solutions essentially containing dimethylol urea" and "solutions essentially containing trimethylol urea".

The aqueous solution to be used according to the invention can be employed for both of the above-described distinct groups of processing procedures. Thus according to the invention, urea bodies such as crystals, pellets, prills and the like may be processed with the aqueous solution, but the aqueous solution may also be added to a concentrated urea solution or melt produced in the synthesis of urea, prior to such solution or melt being processed to form solid bodies, such as crystals, pellets, prills and the like. In both cases the additive according to the invention performs its activity at the surface of the urea bodies. This activity consists in greatly delaying or obviating crystallization at the surface of the urea bodies. The caking of urea pellets is caused by crystallization and recrystallization of urea solution present on the surface of the pellets, resulting in the formation of crystal bridges between the pellets (crystals, prills). By virtue of the additive according to the invention, such crystallization of urea solution present on the pellets is greatly delayed, whereby the formation of such crystal bridges is obviated or inhibited to a very great extent. The result is that the mass of pellets retains its free-flowing nature.

When the additive according to the invention is included in a concentrated urea solution or melt produced in the urea synthesis, before such melt is processed to form solid urea bodies, a portion of the additive will be included in the bodies, so that only a portion of the added quantity will be available at the surface of the pellets to perform its activity. As a consequence, in that embodiment of the invention it will be necessary to use a larger quantity of the additive than in the embodiment in which ready urea bodies are treated with the additive, during which treatment the additive cannot be absorbed in the bodies, but is applied to the surface of the bodies only. The latter embodiment is therefore preferred.

In the most advantageous embodiment of the invention, a mass of urea bodies, such as crystals, pellets, prills, granules and the like, is treated with an aqueous solution essentially containing trimethylol urea in such a quantity as to provide about 3 to about 300 g, preferably about 30 to 150 g trimethylol urea per 100 kg urea to be treated.

Naturally, proportions in excess of 300 g trimethylol urea per 100 kg urea to be treated may be used, but this does not offer any particular advantages. Proportions lower than 3 g trimethylol urea per 100 kg urea to be treated generally inhibits the caking of the urea bodies to an insufficient extent. During or after the treatment the urea is preferably subjected to a mixing treatment to effect uniform distribution of the solution throughout the mass of urea bodies. For this purpose the solution may be added to the urea in a suitable mixer. The treatment may also be carried out in a fluidized bed of the urea bodies to be treated, during which treatment some drying may be effected at the same time. Naturally, other devices may be used, in which the urea bodies can be treated and mixed simultaneously or successively.

The urea bodies are preferably treated in hot condition, for example, at a temperature of about 40° to 80° C., but may also be treated in cooled condition, for example, at a temperature of about 10° to 40° C. If the urea bodies have been treated in hot condition they are preferably cooled after the treatment to a temperature not higher than 35° C. If a processing solution having a low water content, for example, of 20% or less, is used, subsequent drying of the processed urea bodies is not necessary.

Instead of an aqueous solution essentially containing trimethylol urea, it is possible to use an aqueous solution essentially containing dimethylol urea. Since, at ambient temperature, dimethylol urea only has a limited solubility in water (about 20%), a rather large quantity of water will be applied to the urea body in the treatment with a dimethylol urea containing aqueous solution. When such a solution is used, the processed urea is therefore preferably subjected to subsequent drying until the added water from the processing composition has been removed. Since the subsequent drying teatment is an additional cost item, the use of a solution essentially containing trimethylol urea is preferred to one essentially containing dimethylol urea on account of the greater solubility of the trimethylol urea.

In the other embodiment of the invention noted above, which by reason of the required large quantity of additive is less preferred than the embodiment described above, the processing solution is added to a product produced in the synthesis of urea, namely a concentrated urea melt (having a urea concentration of more than about 99.5%) or semi-concentrated urea melt (having a urea concentration of about 80–99.5%), preferably just before the melt is processed to form bodies, such as crystals, pellets, prills and the like. The processing solution may contain dimethylol urea, and/or trimethylol urea and is added in a proportion to provide about 30 to 500 g, preferably about 60 to 300 g, di- and/or trimethylol urea per 100 kg urea in the solution or melt. When less than 30 g per 100 kg urea is used, caking is generally insufficiently inhibited. The use of more than 500 g di- and/or trimethylol urea per 100 kg urea does not present any particular advantages. The thus processed urea solution or melt is then processed to form crystals, pellets, prills and the like in known manner, which are preferably cooled to a temperature below 35° C.

Trimethylol urea containing aqueous solutions can be prepared in a highly simple and cheap manner by the absorption of gaseous formaldehyde in a concentrated, slightly alkaline urea solution until the desired molar ratio of formaldehyde/urea is reached. A suitable process to achieve this is described in Italian patent specification No. 586.942, the relevant contents of which are fully incorporated herein by reference. A product prepared in accordance with the teaching of Italian patent specification No. 586.942 is commercially available under the name of Formurea 80. Formurea 80 is a clear viscous liquid which is stable between $-20°$ and $+40°$ C., and the analysis of which per 100 parts by weight is about 20 parts by weight of water, about 23 parts by weight of urea and about 57 parts by weight of formaldehyde, about 55% of the formaldehyde being bonded as trimethylol urea and the balance being present in non-bonded condition. The molar ratio of formaldehyde/urea (F/U) in Formurea 80 is about 5. The F/U molar ratio can be adjusted to a lower value between about 2 and about 5 by adding urea to Formurea 80. Formurea 80 is very suitable for use in the application of the present invention. it is also possible to use aqueous solutions produced by adding urea to Formurea 80 up to an F/U molar ratio less than 5, but at least 2.

Naturally, it is possible to use aqueous solutions essentially containing trimethylol urea, produced in other ways for the application of the present invention.

Dimethylol urea can be prepared in known manner and is commercially available. Suitable methods of preparation are described in the book by P. Talet, "Aminoplastes", pp. 22 and 23 and in French Patent Specification No. 891.569.

The urea processed in accordance with the present invention can be used for the same purpose for which urea is normally being applied. It is fully soluble in water and can be used for the preparation of highly concentrated urea/ammonium nitrate, urea/diammonium phosphate, and urea/ammonia solutions without any objections; the solutions thus produced are clear and remain clear during storage. The product can also be used without any objections for the production of urea/formaldehyde resins and adhesives. It contains no components which are harmful in leaf and soil fertilization and the fodders for ruminants. It produces no foaming in aqueous solution and has no adverse effect on packing materials such as polyethylene bags.

The urea treated in accordance with the present invention exhibits no caking, and stays free-flowing for prolonged periods of time, so that it can be stored in bulk for a period of time without any problems, and can be transported in bulk without any difficulties even in areas having greatly fluctuating temperatures and weather conditions.

The invention and its effect are illustrated in and by the following examples.

EXAMPLES I–XII

Urea prills at a temperature of about 70° C. were sprayed in a rotary mixing drum with processing solutions in various dosages. The residence time of the urea prills in the drum was about 7 minutes. Subsequently the prills were cooled to about 30° C.

Treated and untreated urea prills were packed in bags of 35 kg, which were stored under a weight of about 1000 kg. After a certain storage period, the average number of lumps per bag was determined, and the average hardness of the lumps was measured. By hardness is understood the force in kg, exercised by a dynamometer for disintegrating a lump or 7×7×5 cm. Also determined was the moisture content of the urea prills.

The results of these tests are reported in table A. In this table, F/U represents the molar ratio of total formaldehyde (bonded and free) to urea in the processing solution. The dose is expressed in grammes processing solution per kg of treated urea.

In Examples I-V Formurea 80 was used as the processing solution. In Examples VI-XII, solutions were used, produced by adding urea to Formurea 80 to the F/U molar ratio indicated.

TABLE A

| Example No. | F/U | Dose g per kg urea | Storage period months | % lumps | Hardness lumps kg | % moisture in prills |
|---|---|---|---|---|---|---|
| control 1 | — | — | 3 | 69 | 7 | 0.25 |
| I | 5 | 0.5 | 3 | 6 | <1 | 0.22 |
| II | 5 | 1.0 | 3 | 0 | 0 | 0.25 |
| III | 5 | 2.5 | 3 | 0 | 0 | 0.27 |
| control 2 | — | — | 5 | 100 | 20 | 0.33 |
| IV | 5 | 1.5 | 5 | 30 | 3 | 0.30 |
| V | 5 | 2.5 | 5 | 8 | <1 | 0.28 |
| control 3 | — | — | 3 | 54 | 8 | 0.17 |
| VI | 2 | 0.1 | 3 | 18 | 3 | 0.17 |
| VII | 2 | 0.25 | 3 | 0 | 0 | 0.14 |
| VIII | 2 | 0.5 | 3 | 0 | 0 | 0.17 |
| IX | 2 | 1.0 | 3 | 0 | 0 | 0.17 |
| X | 2 | 2.5 | 3 | 0 | 0 | 0.17 |
| XI | 3 | 1.0 | 3 | 0 | 0 | 0.17 |
| XII | 4 | 1.0 | 3 | 0 | 0 | 0.17 |

*at ambient temperature of 10° ± 5° C.

These results show that the caking of urea prills can be fully prevented by spraying with a suitable quantity of Formurea 80 or by adding urea-modified Formurea 80.

EXAMPLES XIII-XVII

To a urea melt having a urea concentration of 99.7%, produced in the urea synthesis, Formurea 80 was added in various doses just before prilling, whereafter the melt was processed into prills, which were cooled to about 30° C. The resulting prills were tested in the manner described above. The results are listed in Table B, in which the dose is expressed in grammes Formurea 80 per kg urea in the melt.

TABLE B

| Example No. | F/U | Dose g per kg urea | Storage period* months | % lumps | Hardness lumps kg | % moisure in prills |
|---|---|---|---|---|---|---|
| control 4 | — | — | 3 | 54 | 4 | 0.16 |
| XIII | 5 | 1.0 | 3 | 0 | 0 | 0.18 |
| XIV | 5 | 2.5 | 3 | 0 | 0 | 0.20 |
| XV | 5 | 5.0 | 3 | 0 | 0 | 0.28 |

TABLE B-continued

| Example No. | F/U | Dose g per kg urea | Storage period* months | % lumps | Hardness lumps kg | % moisure in prills |
|---|---|---|---|---|---|---|
| XVI | 5 | 7.5 | 3 | 0 | 0 | 0.37 |
| XVII | 5 | 15.0 | 3 | 0 | 0 | 0.67 |

*at ambient temperature of 10° ± 5° C.

EXAMPLES XVIII-XIX

Urea prills were treated and tested in the manner described with regard to Examples I-XII. The processing solution was a 20% aqueous solution of commercial dimethylol urea. The results are listed in Table C, in which the dose is expressed in grammes dimethylol urea per kg treated urea.

In Example XVIII, the prills were subjected to the test without drying. In Example XIX the treated prills were first dried for 30 minutes with air of 100° C. before being tested.

TABLE C

| Example No. | Dose g per kg urea | Storage period* months | % lumps | Hardness lumps kg | % moisture in prills |
|---|---|---|---|---|---|
| control 5 | — | 1.5 | 100 | 8 | 0.27 |
| XVIII | 1.0 | 1.5 | 35 | 5 | 0.78 |
| XIX | 1.0 | 1.5 | 0 | 0 | 0.30 |

*at ambient temperature of 35° C.

These results show that urea prills are also prevented from caking by being sprayed with a dimethyol urea containing aqueous solution, especially if the prills are dried subsequent to the spraying treatment.

COMPARITIVE TESTS

In a series of experiments various materials were added to a urea solution having a urea content of 95%, produced in the urea synthesis, whereafter the solution was processed into prills, which were cooled to about 30° C. The results are listed in Table D.

Condensation product A is a composition, produced in accordance with the Examples of U.S. Pat. No. 3,112,343. The product consists of urea units linked by methylene groups (—$CH_2$—).

TABLE D

| Comparative test No. | Additive | Dose g per kg urea | Storage period* months | % lumps | Hardness lumps kg | % moisture in prills |
|---|---|---|---|---|---|---|
| 1 | none | — | 3 | 46 | 5 | 0.39 |
| 2 | condensation product A | 5.0 | 3 | 6 | <1 | 0.37 |
| 3 | formaldehyde | 3.9 | 3 | 62 | 5 | 0.40 |
| 4 | Formurea 80 | 2.5 | 3 | 4 | <1 | 0.31 |

*at an ambient temperature of 20° C.

In tests 2, 3 and 4, the quantities of additive were selected so that the added quantity of formaldehyde (free and/or bonded) were invariably the same.

In a second series of tests, urea prills were treated and tested as described above with regard to Examples I-XII.

Product B is an alkaline mixture of urea and formaldehyde having an F/U molar ratio of 1.30, prepared in accordance with U.S. Pat. No. 3,477,842.

Product C is a mixture of polyvinyl acetate, a urea-formaldehyde consensate and a detergent, which mixture is commericially available.

The results of the second series of tests are listed in Table E.

TABLE E

| Comparative test No. | Processing agent | Dose g per kg urea | Storage period* months | % lumps | Hardness lumps kg | % moisture in prills |
|---|---|---|---|---|---|---|
| 5 | none | — | 3 | 37 | 6 | 0.38 |
| 6 | product B | 2.5 | 3 | 100 | 7 | 0.46 |
| 7 | Formurea 80 | 1.0 | 3 | 1 | <1 | 0.47 |
| 8 | none | — | 3 | 69 | 6.9 | 0.25 |
| 9 | product C | 0.25 | 3 | 46 | 4.3 | 0.24 |
| 10 | product C | 0.50 | 3 | 38 | 4.7 | 0.23 |
| 11 | product C | 0.75 | 3 | 26 | 3 | 0.25 |
| 12 | product C | 1.0 | 3 | 28 | 3 | 0.25 |

*at ambient temperature of 20° C.

In test 6, the prills sprayed with product B were first dried for 30 minutes at 100° C. and only then subjected to the test.

EXAMPLE XX

During the winter season, urea prills were stored in two silos in the open air.

In a 4000 kg silo, prills sprayed with 1 g Formurea 80 per kg urea were stored for 3½ months. In a silo of 8000 kg, prills produced by prilling a urea melt, to which 5 g Formurea 80 per kg urea had been added to the melt, were stored for 5½ months. The silos were provided with discharge slides at the bottom.

After the storage period, when the two silos were opened, the contents of both silos were found to be perfectly free-flowing. The prills readily flowed out of the silos. Now and again, a crust having a thickness of 8–10 cm remained standing at the walls, but when the silos were further emptied, such crusts automatically disintegrated entirely.

Experience shows that untreated urea prills stored in a silo in the same way for the same period of time cannot be removed from the silo except by dissolution in water, since they have caked together to a solid body.

We claim:

1. A process for treating urea pellets, prills and like urea bodies to reduce their tendency to cake, which comprises treating said urea bodies with an aqueous solution containing an effective amount of trimethylol urea, which solution contains about 2 to about 5 mol of bonded and free formaldehyde per mol of urea.

2. A process according to claim 1, which comprises mixing the solution with a mass of the urea bodies to be treated.

3. A process according to claim 1, which comprises mixing the mass of urea bodies with an amount of solution containing about 3 to about 300 g of trimethylol urea per 100 kg urea in the mass to be treated.

4. A process according to claim 1, which comprises mixing the mass of urea bodies with an amount of solution containing about 30 to about 150 of trimethylolurea per 100 kg urea in the mass to be treated.

5. A process according to claim 1, wherein the urea bodies are processed in hot condition and after the treatment cooled to a temperature below 35° C.

6. A process according to claim 1 which comprises mixing a mass of urea bodies with an aqueous solution containing per 100 parts of solution about 20 parts of water, about 23 parts of urea and about 57 parts of formaldehyde, about 55% of the formaldehyde being bonded essentially as trimethylol urea and the balance being present in unbonded condition, the molar ratio of formaldehyde/urea in said solution being about 5.

7. A process according to claim 1 which comprises mixing a mass of urea bodies with an aqueous solution obtained by adding urea to a master solution containing per 100 parts of solution about 20 parts of water, about 23 parts of urea and about 57 parts of formaldehyde, about 55% of the formaldehyde being bonded essentially as trimethylol urea and the balance being present in unbonded condition, the molar ratio of formaldehyde to urea in said master solution being about 5, the amount of urea added to the master solution being sufficient to reduce the molar ratio of formaldehyde to urea to a value between about 2 and about 5.

8. In a process for the preparation of urea by reacting ammonia and carbon dioxide at elevated temperature and pressure and processing the resulting urea solution to form urea bodies, such as pellets, prills and the like, the improvement which comprises reducing the tendency of the urea bodies to cake by adding to the concentrated urea solution or melt having a urea concentration of at least about 80%, an aqueous solution containing an effective amount of trimethylol urea, which solution contains about 2 to about 5 mol of bonded and free formaldehyde per mol of urea.

9. A process according to claim 8, wherein the aqueous solution is added to the concentrated urea solution or melt just before the latter is processed to form the urea bodies.

10. A process according to claim 8 wherein the aqueous solution is added to the concentrated urea solution or melt in a proportion to provide about 30 to about 500 gram of trimethylol urea per 100 kg urea in the concentrated urea solution or melt.

11. A process according to claim 8 wherein the aqueous solution is added to the concentrated urea solution or melt in a proportion to provide about 60 to about 300 gram of trimethylol urea per 100 urea in the concentrated urea solution or melt.

12. A process according to claim 8, wherein the processed urea bodies are cooled to a temperature of 35° C.

13. In a process for the preparation of urea by reacting ammonia and carbon dioxide at elevated temperature and pressure, and processing the resulting urea solution to form urea bodies, such as pellets, prills and the like, the improvement which comprises adding to the concentrated urea solution or melt with a urea concentration of at least 80%, an aqueous solution containing per 100 parts of solution about 20 parts of water, about 23 parts of urea and about 57 parts of formaldehyde, about 55% of the formaldehyde being bonded essentially as trimethylol urea, and the balance being present in unbonded condition, said aqueous solution being added in an amount containing about 30 to about 500 g trimethylol urea per 100 kg urea in the concentrated urea solution or melt.

14. A process according to claim 13, which comprises adding said aqueous solution in an amount containing 60–300 gram trimethylol urea per 100 kg urea in the concentrated urea solution or melt.

15. A process according to claim 13, wherein the processed urea bodies are cooled to a temperature below 35° C.

16. In a process for the preparation of urea by reacting ammonia and carbon dioxide at elevated temperature and pressure, and processing the resulting urea solution to form urea bodies, such as pellets, prills and the like, the improvement which comprises reducing the tendency of the urea bodies to cake by adding to the concentrated urea solution or melt with a urea concentration of at least 80% an aqueous solution obtained by adding urea to a master solution containing per 100 parts of solution about 20 parts of water, about 23 parts of urea and about 57 parts of formaldehyde, about 55% of the formaldehyde being bonded essentially as trimethylol urea, and the balance being present in unbonded condition, the molar ratio of formaldehyde to urea in said master solution being about 5, the amount of urea added to the master solution being sufficient to reduce the molar ratio of formaldehyde to urea to a value between about 2 and about 5, said aqueous solution being added to the concentrated urea solution or melt in an amount containing about 30 to about 500 g trimethylol urea per 100 kg urea in the concentrated urea solution or melt.

17. Process according to claim 16 which comprises adding said aqueous solution in an amount containing 60–300 g trimethylol urea per 100 kg urea in the concentrated urea solution or melt.

18. A process according to claim 16 wherein the processed urea bodies are cooled to a temperature below 35° C.

19. An improved form of urea having reduced tendency to cake which comprises urea bodies produced by treating urea pellets or prills with an aqueous solution containing an effective amount of trimethylol urea, which solution contains about 2 to about 5 mol of bonded and free formaldehyde per mol of urea.

20. A product according to claim 19 in which said urea bodies have been treated with a solution containing about 3 to about 300 g of said trimethylol urea per 100 kg of urea.

21. An improved form of urea having reduced tendency to cake which comprises urea pellets or prills produced from a concentrated urea solution or melt with a urea concentration of at least 80%, to which urea solution or melt having been added an aqueous solution containing an effective amount of trimethylol urea, which solution contains about 2 to about 5 mol of bonded and free formaldehyde per mol of urea.

22. A product according to claim 21 in which to said concentrated urea solution or melt has been added to solution containing about 30 to about 500 g of trimethylol urea per 100 kg urea in the concentrated urea solution or melt.

* * * * *